(12) United States Patent
Xu

(10) Patent No.: US 11,196,607 B2
(45) Date of Patent: Dec. 7, 2021

(54) SYNCHRONIZATION SIGNAL TRANSMISSION METHOD, TRANSMITTING END DEVICE AND RECEIVING END DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/190,206

(22) Filed: Mar. 2, 2021

(65) Prior Publication Data

US 2021/0185624 A1    Jun. 17, 2021

Related U.S. Application Data

(63) Continuation of application No. PCT/CN2018/106329, filed on Sep. 18, 2018.

(51) Int. Cl.
   *H04L 27/26*   (2006.01)
   *H04L 5/00*    (2006.01)
   *H04L 5/06*    (2006.01)
   *H04L 7/00*    (2006.01)
   *H04W 56/00*   (2009.01)

(52) U.S. Cl.
   CPC ........ *H04L 27/2659* (2013.01); *H04L 5/0048* (2013.01); *H04L 5/06* (2013.01); *H04L 7/0008* (2013.01); *H04W 56/001* (2013.01)

(58) Field of Classification Search
   CPC ..... H04L 27/2659; H04L 5/0048; H04L 5/06; H04W 56/001
   See application file for complete search history.

(56) References Cited

U.S. PATENT DOCUMENTS

2017/0265156 A1   9/2017   Xue et al.
2018/0034599 A1   2/2018   Zhou et al.
(Continued)

FOREIGN PATENT DOCUMENTS

CN   106411805 A   2/2017
CN   107689855 A   2/2018
(Continued)

OTHER PUBLICATIONS

International Search Report dated Mar. 27, 2019 cited in PCT/CN2018/106329.
(Continued)

*Primary Examiner* — Gary Mui
(74) *Attorney, Agent, or Firm* — Perkins Coie LLP

(57) ABSTRACT

Provided are a synchronization signal transmission method, a transmitting end device and a receiving end device. A frequency domain candidate position (also called SS raster) of a synchronization signal on an unlicensed frequency band is designed, the complexity of initial cell search is reduced, and the impact, on the other channels in a subband, of the position of the initial access of a cell in the unlicensed frequency band to a synchronization signal block in the subband is also reduced. The method comprises: a transmitting end device sending a synchronization signal block at a first frequency domain position, wherein the first frequency domain position is located at a frequency domain candidate position of a synchronization signal, and each 20 MHz subband comprises at least one of the synchronization signal frequency domain candidate positions.

16 Claims, 5 Drawing Sheets

(56) References Cited

U.S. PATENT DOCUMENTS

| | | | |
|---|---|---|---|
| 2019/0215219 A1* | 7/2019 | Sun | H04L 27/2686 |
| 2019/0222368 A1* | 7/2019 | Yang | H04L 7/00 |
| 2020/0068512 A1* | 2/2020 | Xue | H04W 56/001 |
| 2020/0145939 A1* | 5/2020 | Harada | H04W 72/0453 |
| 2020/0187159 A1* | 6/2020 | Ko | H04W 72/005 |
| 2020/0344034 A1* | 10/2020 | Moon | H04L 5/0094 |
| 2021/0014805 A1* | 1/2021 | Tang | H04W 48/16 |
| 2021/0076343 A1* | 3/2021 | Harada | H04W 56/001 |

FOREIGN PATENT DOCUMENTS

| | | |
|---|---|---|
| CN | 107920364 A | 4/2018 |
| EP | 3515109 A1 | 7/2019 |
| RU | 2359413 C2 | 6/2009 |
| RU | 2641311 C2 | 1/2018 |
| RU | 2653604 C2 | 5/2018 |
| WO | 2018203672 A1 | 11/2018 |

OTHER PUBLICATIONS

EPO, Extended European Search Report for European Patent Application No. 18933845.2, dated Jun. 29, 2021. 8 pages.
Nokia et al. "Remaining details on NR-PBCH" 3GPP TSG-RAN WG1 NR AH#3, R1-1716524, Sep. 2017. 13 pages.
Rospatent, First Office Action for Russian Patent Application No. 2021107473, dated Apr. 21, 2021. 10 pages with English translation.
IP Australia, Examination Report No. 1 for Australian Application No. 2018441778, dated Sep. 24, 2021. 4 pages.

* cited by examiner

SYNCHRONIZATION SIGNAL TRANSMISSION METHOD, TRANSMITTING END DEVICE AND RECEIVING END DEVICE

CROSS-REFERENCE TO RELATED APPLICATION

The present disclosure is a continuation application of PCT Application No. PCT/CN2018/106329, filed on Sep. 18, 2018, the entire disclosure of which is hereby incorporated by reference.

TECHNICAL FIELD

The embodiments of this application relate to the field of communication, and in particular, to a method of synchronous signal transmission, a transmitting device and a receiving end device.

RELATED ART

In 5-Generation New Radio (5G NR) system, in order to meet the flexibility of network deployment, it is necessary to ensure that cell synchronization signals can be deployed in any available frequency band to assist cell establishment. Driven by the above requirements, the synchronization raster (SS raster) in 5G NR system are relatively dense in order to provide enough frequency position for base stations to establish cells and UE to access the cells.

When communicating on the unlicensed frequency band, the initial access bandwidth of the cell in the unlicensed frequency band is not more than 20 MHz, and the candidate positions of each 20 MHz bandwidth on the unlicensed frequency band are also constrained. Therefore, the deployment of the initial access sub-band position of the cell in the unlicensed frequency band must be limited. It is obviously inefficient to continue to use the dense SS raster defined by 5G NR as the position of synchronization signals for terminal devices to retrieve. Therefore, how to design SS raster with unlicensed frequency band is an urgent problem to be solved.

SUMMARY

The embodiments of this application provide a synchronous signal transmission method, a transmitting device and a receiving end device, and designs frequency domain candidate positions of a synchronous signal on an unlicensed frequency band (also called SS raster), which can reduce the complexity of cell initially searching and reduce the influence of the position, where a cell in the unlicensed frequency band initially access the synchronization signal block (ss/pbch block, SSB) in the subband, on the other channels in the subband.

In the first aspect, a method of synchronous signal transmission is provided, which includes:

The transmitting device transmits a synchronization signal block on a first frequency domain position, the first frequency domain position is located on the frequency domain candidate position of the synchronization signal, and each 20 MHz subband includes at least one frequency domain candidate position of the synchronization signal.

Optionally, the first frequency domain position may be a resource on an unlicensed spectrum.

It should be noted that the transmitting device may be a network device.

In the second aspect, a method of synchronous signal transmission is provided, which includes:

the receiving device monitors for the synchronization signal block on a first frequency domain position, a first frequency domain position is located on the frequency domain candidate position of the synchronization signal, and each 20 MHz subband includes at least one frequency domain candidate position of the synchronization signal.

It should be noted that the receiving device may be a terminal device.

In the third aspect, a transmitting device is provided for performing the methods in the first aspect or the embodiments thereof.

Specifically, the transmitting device includes a functional module for performing the methods in the first aspect described above or the embodiments thereof.

In the fourth aspect, a receiving device is provided for performing the method in the second aspect described above or the embodiments thereof.

Specifically, the receiving device includes a functional module for performing the methods in the second aspect or the embodiments thereof.

In the fifth aspect, a transmitting device is provided, including a processor and a memory. The memory is used to store a computer program, and the processor is used to call and run the computer program stored in the memory to execute the methods in the first aspect or the embodiments thereof.

In the sixth aspect, a receiving device is provided, including a processor and a memory. The memory is used to store a computer program, and the processor is used to call and run the computer program stored in the memory to execute the methods in the second aspect or the embodiments thereof.

In the seventh aspect, a chip is provided to execute the methods in any aspect of the first and the second aspects or the embodiments thereof.

Specifically, the chip includes a processor for calling and running a computer program from a memory so that the device installed with the chip performs the methods in any aspect of the first and the second aspects or the embodiments thereof.

In the eighth aspect, a computer-readable storage medium is provided for storing a computer program that causes the computer to perform the methods in any aspect of the first and the second aspects or the embodiments thereof.

In the ninth aspect, a computer program product is provided, including a computer program instruction that causes the computer to perform the methods in any aspect of the first and the second aspects or the embodiments thereof.

In the tenth aspect, a computer program is provided, when which is running on a computer, causes the computer to perform the methods in any aspect of the first and the second aspects or the embodiments thereof.

DETAILED DESCRIPTION

The following describes the technical solutions in the embodiments of this application with reference to the drawings in the embodiments of this application. Obviously, the described embodiments are some of the embodiments of this application rather than all the embodiments. Based on the embodiments of this application, all other embodiments obtained by a person of ordinary skill in the art without creative efforts shall fall within the protection scope of this application.

The embodiment of this application can be applied to various communication systems, such as global system of mobile communication (GSM), a code division multiple access (CDMA) system, a wideband code division multiple access (WCDMA) system and a general packet radio service (GPRS), a long term evolution (LTE) system, an advanced long term evolution (LTE-A) system, a new radio (NR) system, a NR system evolution system, LTE system on unlicensed spectrum (LTE-U), a NR based access to unlicensed spectrum) system on unlicensed spectrum (NR-U) system, a universal mobile communication system (UMTS), a wireless local area networks (WLAN), a wireless fidelity (WiFi), a next generation communication system or other communication systems.

Generally speaking, the traditional communication system supports a limited number of connections and is easy to implement. However, with the development of communication technology, mobile communication system will not only support traditional communications, but also support, for example, device to device (D2D) communication, machine to machine (M2M) communication, machine type communication (MTC), and vehicle to vehicle (V2V) communication and so on. The embodiments of this application can also be applied to these communication systems.

Optionally, the communication systems in the embodiments of this application can be applied to the carrier aggregation (CA) scenario, the dual connectivity (DC) scenario, and the stand-alone (SA) networking scenario.

The embodiments of this application can be applied to unlicensed spectrum.

Figure 1:
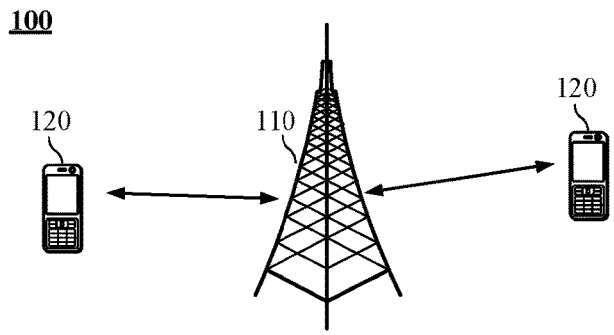
FIG. 1 is a schematic diagram of a communication system architecture according to the embodiment of this application.

For example, the communication system 100 applied by the embodiment of this application is shown in FIG. 1. The communication system 100 may include a network device 110, which may be a device communicating with a terminal device 120 (or called a communication terminal or a terminal). The network device 110 may provide communication coverage for a specific geographical region and may communicate with the terminal devices located in the coverage region.

FIG. 1 illustrates an exemplary network device and two terminal devices. Optionally, the communication system 100 may include a plurality of network devices, and other number of terminal devices may be included within the coverage range of each network device, which is not limited in the embodiments of this application.

Optionally, the communication system 100 may further include a network controller, a mobility management entity and other network entities, which is not limited in the embodiments of this application.

It should be understood that the device with communication function in the network system in the embodiments of this application can be called communication device. Taking the communication system 100 shown in FIG. 1 as an example, the communication device can include the network device 110 and the terminal device 120 with the communication function. The network device 110 and the terminal device 120 may be the specific device described above, which will not be repeated here. The communication device may also include other devices in the communication system 100, such as a network controller, a mobile management entity and other network entities, which are not limited in the embodiments of this application.

The embodiments of this application describe various embodiments in combination with network device and terminal device, wherein the terminal device can also be called a user device (UE), an access terminal, a user unit, a user station, a mobile station, a remote station, a remote terminal, a mobile device, a user terminal, a terminal, a wireless communication device, a user agent or a user device, etc. The terminal device can be a station (ST) in WLAN, a cellular phone, a cordless telephone, a session initiation protocol (SIP) telephone, a wireless local loop (WLL) station, a personal digital assistant (PDA) device, a handheld device with wireless communication function, a computing device or an other processing device connected to a wireless modem, a vehicle device, a wearable device and the next generation communication system, for example, a terminal device in NR network or a terminal device in future evolution public land mobile network (PLMN), etc.

As an example, rather than a limitation, in the embodiments of this application, the terminal device may also be a wearable device. The wearable device may also be called a wearable intelligent device, which is the general term for the wearable devices developed by applying wearable technology to conduct intelligent design for daily wearables, such as glasses, gloves, watches, clothing and shoes, etc. The wearable devices are portable devices which are worn directly on the body or integrated into the user's clothing or accessories. Wearable devices are not only hardware devices, but also a device that implements powerful functions through software support, data interaction and cloud interaction. Generalized wearable intelligent devices include a kind of devices which are full-featured, large-size, and may achieve complete or partial functions without smart phones, such as smart watches or smart glasses, and a kind of devices which are only focus on one kind of application function, and need to cooperate with other devices such as smart phones, such as various types of smart bracelets and smart jewelry for physical signs monitoring.

Network device may be used to communicate with mobile devices. Network device may be an access point (AP) in WLAN, a base transceiver station (BTS) in GSM or CDMA, a NodeB (NB) in WCDMA, an evolutional node B (eNB or eNodeB) in LTE, a relay station or an access point, vehicle devices, wearable devices, network devices in NR network (gNB), or network devices in the future evolution PLMN.

In the embodiments of this application, the network devices provide services for the cell, and the terminal devices communicate with the network devices through the transmission resources (such as frequency domain resources or spectrum resources) used by the cell. The cell may be a cell corresponding to a network device (such as a base station), and the cell may belong to a macro base station or a base station corresponding to a small cell. The small cells here may include: a Metro cell, a Micro cell, a Pico cell, a Femto cell, etc. These small areas have the characteristics of small coverage and low transmission power, which are suitable for providing high-speed data transmission services.

It should be understood that, in 5G NR, the terminal device may search for synchronization signals on SS raster, then find cells and attempt to initiate access. The design details of SS raster for 5G NR are described in detail in 3GPP protocol 38.101. For example, the frequency domain positions of synchronization signals below 6 GHz are shown in Table 1.

TABLE 1

| Frequency Range | Frequency domain positions of synchronous signal blocks |
| --- | --- |
| 0-3000 MHz | N * 1200 kHz + M * 50 kHz, N = 1:2499, M ∈ {1, 3, 5} |
| 3000-6000 MHz | 3000 MHz + N * 1.44 MHz N = 0:14756 |

It should also be understood that in the study of unlicensed frequency bands, channel candidate positions for 20 MHz bandwidth are limited, as shown in Formula 1.

$$fc=5160+(g*20) \text{ MHz} \quad \text{(Formula 1)}$$

wherein $0 \leq g \leq 9$ or $16 \leq g \leq 27$, g is an integer.

In addition, in the study of unlicensed frequency bands, the initial access bandwidth of the cells in unlicensed frequency bands is further restricted to less than 20 MHz. Therefore, the initial access sub-band positions of the cells in unlicensed frequency bands will not be deployed at will like 5G NR.

After considering the above characteristics of the unlicensed frequency bands, it is obviously inefficient to continue to use the relatively dense SS raster defined by 5G NR as the positions of the synchronization signals for the terminal device to retrieve. How to redesign the SS raster of the unlicensed frequency bands will be a new problem. It will also be a new problem to consider which related factors should be considered when redesigning SS raster of unlicensed frequency bands. Based on considering the above problems, this application proposes a design method of synchronous signal transmitting and receiving positions in unlicensed frequency band.

Figure 2:
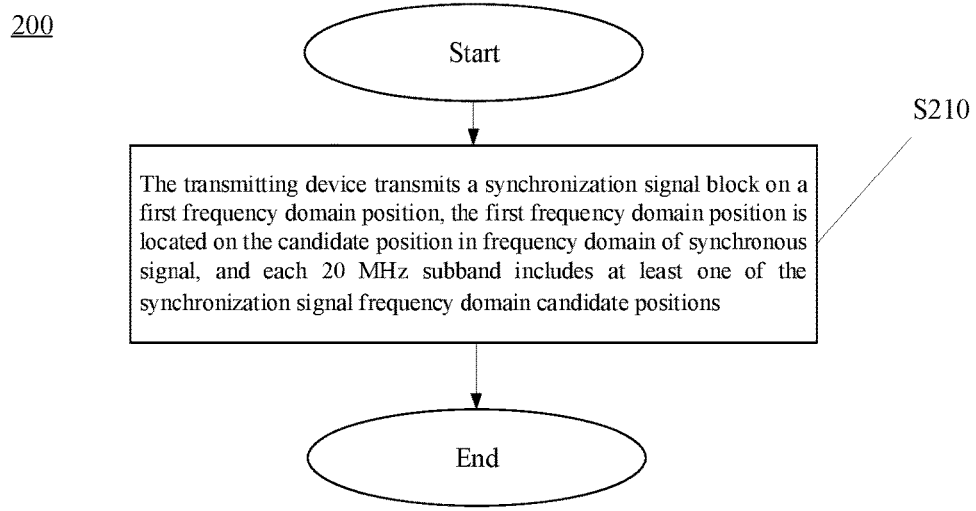
FIG. 2 is a schematic flow chart of a synchronous signal transmission method according to the embodiment of this application.

FIG. 2 is a schematic flow chart of a synchronous signal transmission method 200 according to the embodiment of this application. As shown in FIG. 2, the method 200 may include the following contents:

S210, the transmitting device transmits a synchronization signal block on a first frequency domain position, the first frequency domain position is located on the candidate position in frequency domain of synchronous signal, and each 20 MHz subband includes at least one of the synchronization signal frequency domain candidate positions.

Optionally, the transmitting device may be a network device, for example, a network device as shown in FIG. 1

It should be noted that the frequency domain candidate positions of the synchronization signals may be the SS raster on the unlicensed frequency bands.

It should be noted that, in the design of the candidate positions in frequency domain of synchronous signals, considering that the PDCCH and the synchronous signal block multiplex the frequency domain in the unlicensed frequency band, and the frequency domain granularity of the basic constituent unit of PDCCH needs six consecutive RBs, when designing the synchronous signal block positions within 20M bandwidth, it needs to be ensured that after removing the frequency bandwidth occupied by synchronous signal blocks within 20M bandwidth so that the remaining part shall be continuous 6 RBs or integer multiples of 6 RBs.

Optionally, in the embodiment of this application, the first frequency domain position can satisfy the following three situations:

In case 1, the first frequency domain position is the center frequency point position of the synchronization signal block;

In case 2, the first frequency domain position is the position of the resource element (RE) with the smallest number in the resource block (RB) with the smallest number of the synchronous signal block;

In case 3, the first frequency domain position is the position of the RE with the largest number in the RB with the largest number of the synchronous signal block.

Optionally, as an example 1, the first frequency domain position satisfies the case 1, that is, the first frequency domain position is the center frequency point position of the synchronization signal block.

Optionally, in example 1, the transmitting device determines the frequency domain candidate position of the synchronization signal according to formula 2, $$fc=f1+(g*20)+f2 \quad \text{Formula 2}$$

wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset of the candidate position of the center frequency point of the synchronous signal within a 20 MHz subband.

Optionally, in example 1, the value of the f2 is at least one of 180 hz, −180 kHz; or the value of the f2 is at least one of 0 Hz, 360 hz and −360 kHz.

Optionally, in example 1, the transmitting device determines that the f2 is at least one value satisfying any one of the formulas in formulas 3, 4, 5 and 6.

$$f2=\pm(25.5-(6N+10))*12*30 \text{ kHz} \quad \text{Formula 3}$$

wherein 0≤n≤5.

$$f2=\pm(53-(6N+10))*12*15 \text{ KHz} \quad \text{Formula 4}$$

wherein 0≤n≤14.

$$f2=\pm(26-(6N+10))*12*30 \text{ kHz} \quad \text{Formula 5}$$

wherein 0≤n≤5.

$$f2=\pm(25-(6N+10))*12*30 \text{ kHz} \quad \text{Formula 6}$$

wherein 0≤n≤5.

It should be noted that the Formula 3 is applicable to the scenario that the 20 MHz unlicensed bandwidth includes 51 30 kHz RBS, the subcarrier spacing is 30 kHz, and the center points of 51 30 kHz RBs are 25.5 30 kHz RBs.

The Formula 4 is applicable to the scenario that 20 MHz unlicensed bandwidth includes 106 15 KHz RBs, the subcarrier spacing is 15 KHz, and the center points of 106 15 kHz RBs are 53 15 kHz RBs.

The Formula 5 is applicable to the scenario that 20 MHz unlicensed bandwidth includes 51 30 kHz RBs, the subcarrier spacing is 30 kHz, and the center points of 51 30 kHz RBS are rounded up to 26 30 kHz RBs.

The Formula 5 is applicable to the scenario that 20 MHz unlicensed bandwidth includes 51 30 kHz RBs, the subcarrier spacing is 30 kHz, and the center points of 51 30 kHz RBS are rounded down to 25 30 kHz RBs.

Optionally, in example 1, the transmitting device determines that the f2 satisfies at least one value according to formula 7 or formula 8.

$$f2=\pm(N_{bw}/2-(6N+N_{ssb}/2))*N_{sc}*\Delta F \text{ kHz} \quad \text{Formula 7}$$

Wherein, $N_{bw}$ is the number of RBs within the 20 MHz bandwidth when the subcarrier spacing is ΔF, $N_{ssb}$ is the number of RBs occupied by synchronous signal block in frequency domain, $N_{sc}$ is the number of subcarriers in one RB, and N is an integer.

$$f2=\pm((N_{bw}\pm1)/2-(6N+N_{ssb}/2))*N_{sc}*\Delta f \text{ kHz} \quad \text{Formula 8}$$

Wherein, $N_{bw}$ is the number of RBs within 20 MHz bandwidth when the subcarrier spacing is ΔF, $N_{ssb}$ is the number of RBs occupied by synchronous signal block in frequency domain, $N_{sc}$ is the number of subcarriers in one RB, and N is an integer.

Optionally, in example 1, the value of the f2 is at least one of 5580 kHz, 3420 kHz, 1260 kHz, −900 kHz, −3060 kHz and −5220 kHz; or the value of the f2 is at least one of 5220 kHz, 3060 kHz, 900 kHz, −1260 kHz, −3420 kHz and −5580 kHz; or the value of the f2 is at least one of 5760 kHz, 3600 kHz, 1440 kHz, −720 kHz, −2880 kHz and −5040 kHz; or the value of the f2 is at least one of 5040 kHz, 2880 kHz, 720 kHz, −1440 kHz, −3600 kHz and −5760 kHz; or the value of THE F2 is at least one of 5400 kHz, 3240 kHz, 1080 kHz, −1080 kHz, −3240 kHz and −5400 kHz.

Optionally, as example 2, the first frequency domain position satisfies the case 2. That is, the first frequency domain position is the position of the RE with the smallest number in the RB with the smallest number of the synchronous signal block.

Optionally, in example 2, the transmitting device determines the frequency domain candidate position of the synchronization signal according to formula 9, $$fc=f1+(g*20)+f2+f3 \quad \text{Formula 9}$$

Wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset of the candidate position of the center frequency point of the synchronous signal within a 20 MHz subband, f3 is the offset of the position of the RE with the smallest number in the RB with the smallest number of the synchronous signal block from the position of the center frequency point of the synchronous signal block.

Optionally, in example 2, the value of the f2 is at least one of 180 hz, −180 kHz; or the value of the f2 is at least one of 0 Hz, 360 hz and −360 kHz.

Optionally, in example 2, the transmitting device determines that the f2 is at least one value satisfying any one of the formulas 3, 4, 5 and 6.

Optionally, in example 2, the transmitting device determines that the f2 satisfies at least one value according to the formula 7 or formula 8.

Optionally, in example 2, the value of the f2 is at least one of 5580 kHz, 3420 kHz, 1260 kHz, −900 kHz, −3060 kHz and −5220 kHz; or the value of the f2 is at least one of 5220 kHz, 3060 kHz, 900 kHz, −1260 kHz, −3420 kHz and −5580 kHz; or the value of the f2 is at least one of 5760 kHz, 3600 kHz, 1440 kHz, −720 kHz, −2880 kHz and −5040 kHz; or the value of the f2 is at least one of 5040 kHz, 2880 kHz, 720 kHz, −1440 kHz, −3600 kHz and −5760 kHz; or the value of the f2 is at least one of 5400 kHz, 3240 kHz, 1080 kHz, −1080 kHz, −3240 kHz and −5400 kHz.

Optionally, in example 2,

If the synchronous signal block occupies 20 RBs in the frequency domain, and the subcarrier spacing of the synchronous signal blocks is 30 kHz, the transmitting device determines that the f3=−3600 kHz; or If the synchronous signal block occupies 20 RBs in the frequency domain, and the subcarrier spacing of the synchronous signal blocks is 15 kHz, the transmitter determines that the f3=−1800 kHz.

Optionally, as example 3, the first frequency domain position satisfies case 3. That is, the first frequency domain position is the position of the RE with the largest number in the RB with the largest number of the synchronous signal block.

Optionally, in example 3, the transmitting device determines the frequency domain candidate position of the synchronization signal according to formula 10, $$fc=f1+(g*20)+f2+f4 \quad \text{Formula 10}$$

Wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset of the candidate position of the center frequency point of the synchronous signal within a 20 MHz subband, f4 is the offset of the position of the RE with the largest number in the RB with the largest number of the synchronous signal block from the center frequency point of the synchronous signal block.

Optionally, in example 3,
the value of the f2 is at least one of 180 hz, −180 kHz; or
the value of the f2 is at least one of 0 Hz, 360 hz and −360 kHz.

Optionally, in example 3, the transmitting device determines that the f2 is at least one value satisfying any one of the formulas 3, 4, 5 and 6.

Optionally, in example 3, the transmitting device determines that the f2 satisfies at least one value according to the formula 7 or formula 8.

Optionally, in example 3, the value of the f2 is at least one of 5580 kHz, 3420 kHz, 1260 kHz, −900 kHz, −3060 kHz and −5220 kHz; or the value of the f2 is at least one of 5220 kHz, 3060 kHz, 900 kHz, −1260 kHz, −3420 kHz and −5580 kHz; or the value of the f2 is at least one of 5760 kHz, 3600 kHz, 1440 kHz, −720 kHz, −2880 kHz and −5040 kHz; or the value of the f2 is at least one of 5040 kHz, 2880 kHz, 720 kHz, −1440 kHz, −3600 kHz and −5760 kHz; or the value of the f2 is at least one of 5400 kHz, 3240 kHz, 1080 kHz, −1080 kHz, −3240 kHz and −5400 kHz.

Optionally, in example 3,
If the synchronous signal block occupies 20 RBs in the frequency domain, and the subcarrier spacing of the synchronous signal block is 30 kHz, the transmitting device determines that the f4=3600 kHz; or If the synchronous signal block occupies 20 RBs in the frequency domain, and the subcarrier spacing of the synchronous signal block is 15 kHz, the transmitting device determines that the f4=1800 kHz.

Optionally, as an embodiment 1, the first frequency domain position is the center frequency point position of the synchronization signal block. That is, the transmitting device determines the frequency domain candidate position of the synchronization signal according to the Formula 2.

Figure 3:
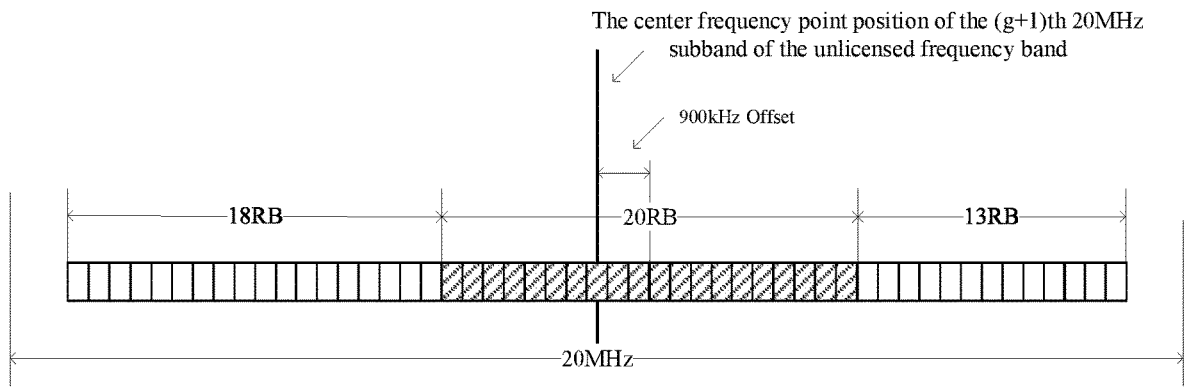
FIG. 3 is another schematic diagram of a synchronous signal transmission according to an embodiment of this application.

Specifically, as shown in FIG. 3, in the embodiment 1, the values of parameters in Formula 2 are as follows:
f1=5160 mhz, which is the center frequency point of the first 20 MHz subband of the unlicensed frequency band;
f1+(g*20) is the center frequency position of the (g+1)th 20 MHz subband of the unlicensed frequency band, and g is an integer;
f2=−(25.5−(6*3+10))*12*30 kHz=900 kHz.

To sum up, it is concluded that the frequency domain candidate positions of the synchronous signal are: fc=5160.9+(g*20) MHz, g is an integer.

It should be noted that, as shown in FIG. 3, in additional to the 20 30 kHz RBs occupied by the synchronous signal block, there are 18 30 kHz continuous RBs. The 18 30 kHz RBs can ensure the PDCCH transmission. That is, the multiplexing in frequency domain of PDCCH and synchronous signal block is realized.

Specifically, in the embodiment 1, when the network device transmits the synchronization signal on the unlicensed frequency band, the synchronization signal block occupies 20 30 kHz RB in the frequency domain (referring to the area represented by the shaded part in FIG. 3), and the network device selects one or more frequency points from the frequency points corresponding to fc to send the synchronous signal block. The central frequency point of the synchronization signal block is located in the frequency point selected by the network device. When the terminal device conducts cell search on the unlicensed frequency band, it tries to search the synchronization signal on the frequency points corresponding to fc.

Optionally, as an embodiment 2, the first frequency domain position is the center frequency point position of the synchronization signal block. That is, the transmitting device determines the frequency domain candidate position of the synchronization signal according to the Formula 2.

Figure 4:
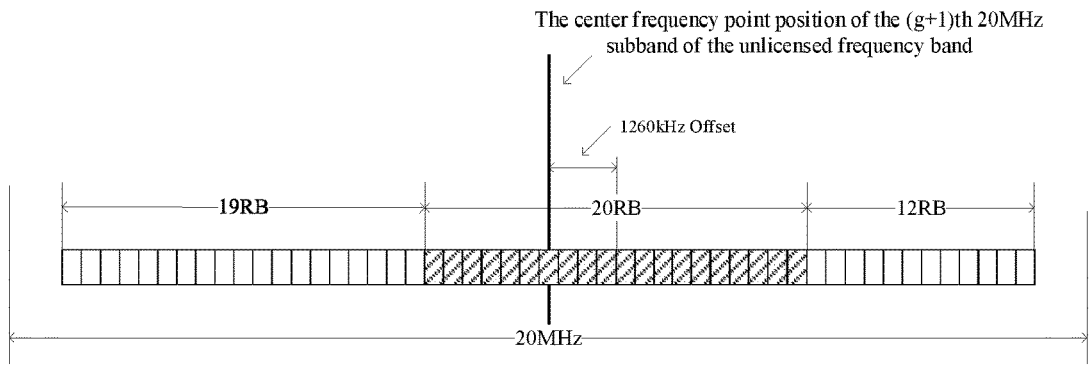
FIG. 4 is another schematic diagram of another synchronous signal transmission according to an embodiment of this application.

Specifically, as shown in FIG. 4, in the embodiment 2, the values of parameters in Formula 2 are as follows:
f1=5160 MHz, which is the center frequency point of the first 20 MHz subband of the unlicensed frequency band;
f1+(g*20) is the center frequency position of the (g+1)th 20 MHz subband of the unlicensed frequency band, and g is an integer;
f2=(25.5−(6*2+10))*12*30 kHz=1260 kHz.

To sum up, it is concluded that the frequency domain candidate positions of the synchronous signal are: fc=5161.26+(g*20) MHz, g is an integer.

It should be noted that, as shown in FIG. 4, in additional to the 20 30 kHz RBs occupied by the synchronous signal block, there are 12 30 kHz continuous RBs. The 12 30 kHz RBs can ensure the PDCCH transmission. That is, the multiplexing in frequency domain of PDCCH and synchronous signal block is realized.

Specifically, in embodiment 2, when the network device transmits the synchronization signal on the unlicensed frequency band, the synchronization signal block occupies 20 30 kHz RBs in the frequency domain (referring to the area represented by the shaded part in FIG. 4), and the network device selects one or more frequency points from the frequency points corresponding to fc to send the synchronous signal block. The central frequency point of the synchronization signal block is located on the frequency point selected by the network device. When the terminal device conducts cell search on the unlicensed frequency band, it tries to search the synchronization signal on the corresponding frequency points corresponding to fc.

Optionally, as an embodiment 3, the first frequency domain position is the center frequency point position of the synchronization signal block. That is, the transmitting device determines the frequency domain candidate position of the synchronization signal according to the Formula 2.

Figure 5:
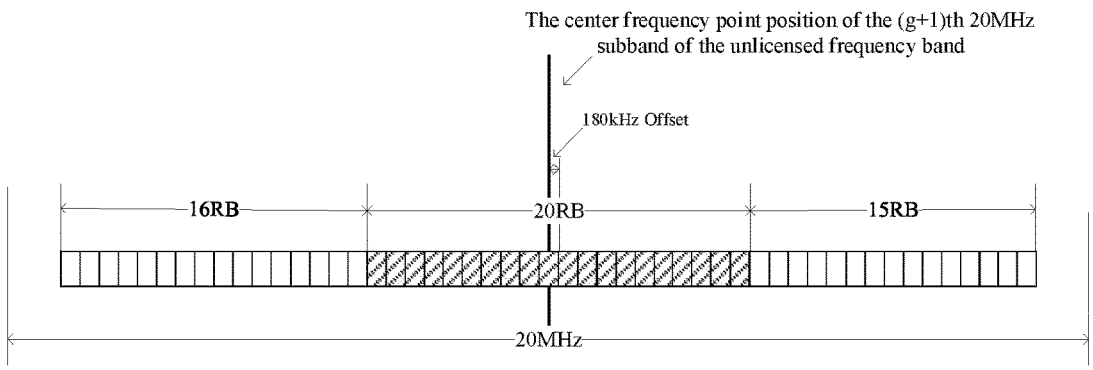
FIG. 5 is another schematic diagram of another synchronous signal transmission according to an embodiment of this application.

Specifically, as shown in FIG. 5, in the third embodiment, the values of parameters in Formula 2 are as follows:
f1=5160 MHz, which is the center frequency point of the first 20 MHz subband of the unlicensed frequency band;
f1+(g*20) is the center frequency position of the (g+1)th 20 MHz subband of the unlicensed frequency band, and g is an integer;
f2=−180 kHz.

To sum up, it is concluded that the frequency domain candidate positions of the synchronous signal are: fc=5159.82+(g*20) MHz, and g is an integer.

Specifically, in the embodiment 3, when the network device transmits the synchronization signal on the unlicensed frequency band, the synchronization signal block occupies 20 30 kHz RBs in the frequency domain (referring to the area represented by the shaded part in FIG. 5), and the network device selects one or more frequency points from the frequency points corresponding to fc to send the synchronous signal block. The central frequency point of the synchronization signal block is located on the frequency point selected by the network device. When the terminal device conducts cell search on the unlicensed frequency band, it tries to search the synchronization signal on the corresponding frequency points corresponding to fc.

Optionally, as an embodiment 4, the first frequency domain position is the center frequency point position of the synchronization signal block. That is, the transmitting device determines the frequency domain candidate positions of the synchronization signal according to the Formula 2.

Figure 6:
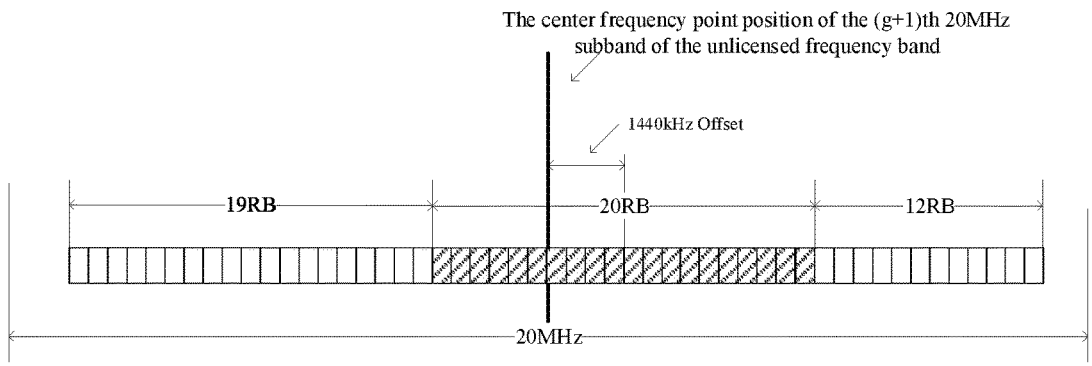
FIG. 6 is another schematic diagram of another synchronous signal transmission according to an embodiment of this application.

Specifically, as shown in FIG. 6, in the embodiment 4, the values of parameters in Formula 2 are as follows:

f1=5160 mhz, which is the center frequency point of the first 20 MHz subband of the unlicensed frequency band;

f1+(g*20) is the center frequency position of the (g+1)th 20 MHz subband of the unlicensed frequency band, and g is an integer;

f2=(26−(6*2+10))*12*30 kHz=1440 kHz.

To sum up, it is concluded that the frequency domain candidate positions of the synchronous signal are fc=5161.44+(g*20) MHz, and g is an integer.

It should be noted that, as shown in FIG. 6, there are 12 30 kHz continuous RBS outside the 20 30 kHz RBS occupied by the synchronous signal block. These 12 30 kHz RBS can ensure the transmission of PDCCH, that is, the multiplexing in frequency domain of PDCCH and synchronous signal block is realized.

Specifically, in the embodiment 4, when the network device transmits the synchronization signal on the unlicensed frequency band, the synchronization signal block occupies 20 30 kHz RBs in the frequency domain (referring to the area represented by the shaded part in FIG. 6), and the network device selects one or more frequency points from the frequency points corresponding to fc to send the synchronous signal block. The central frequency point of the synchronization signal block is located on the frequency point selected by the network device. When the terminal device conducts cell search on the unlicensed frequency band, it tries to search the synchronization signal on the corresponding frequency points corresponding to fc.

Optionally, as an embodiment 5, the first frequency domain position is the center frequency point position of the synchronization signal block. That is, the transmitting device determines the frequency domain candidate positions of the synchronization signal according to the Formula 2.

Figure 7:
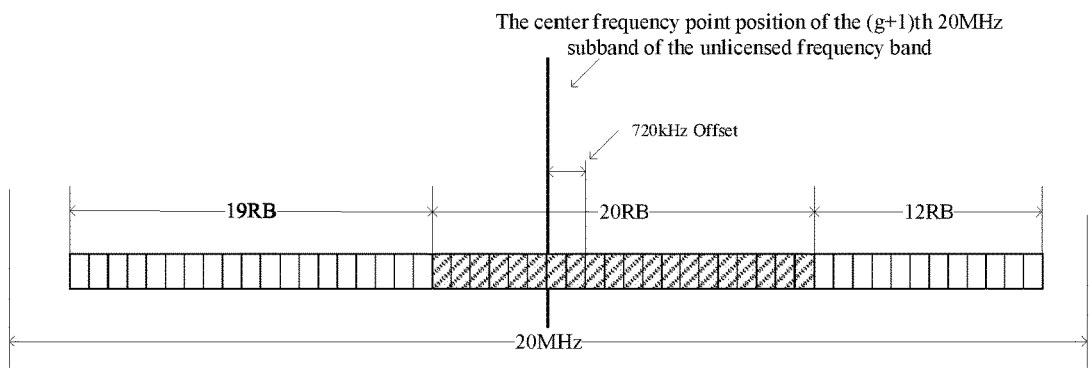
FIG. 7 is another schematic diagram of another synchronous signal transmission according to the embodiment of this application.

Specifically, as shown in FIG. 7, in the embodiment 5, the values of parameters in formula 2 are as follows:

f1=5160 mhz, which is the center frequency point of the first 20 MHz subband of the unlicensed frequency band;

f1+(g*20) is the center frequency position of the (g+1)th 20 MHz subband of the unlicensed frequency band, and g is an integer;

f2=−(26−(6*3+10))*12*30 kHz=720 kHz.

To sum up, it is concluded that the frequency domain candidate positions of the synchronous signal are: fc=5160.72+(g*20) MHz, and g is an integer.

It should be noted that, as shown in FIG. 7, in additional to the 20 30 kHz RBs occupied by the synchronous signal block, there are 18 30 kHz continuous RBs. The 18 30 kHz RBS can ensure the PDCCH transmission. That is, the multiplexing in frequency domain of PDCCH and synchronous signal block is realized.

Specifically, in the embodiment 5, when the network device transmits the synchronization signal on the unlicensed frequency band, the synchronization signal block occupies 20 30 kHz RBs in the frequency domain (referring to the area represented by the shaded part in FIG. 7), and the network device selects one or more frequency points from the frequency points corresponding to fc to send the synchronous signal block. The central frequency point of the synchronization signal block is located on the frequency point selected by the network device. When the terminal device conducts cell search on the unlicensed frequency band, it tries to search the synchronization signal on the corresponding frequency points corresponding to fc.

Optionally, as an embodiment 6, the first frequency domain position is the center frequency point position of the synchronization signal block. That is, the transmitting device determines the frequency domain candidate position of the synchronization signal according to the Formula 2.

Figure 8:
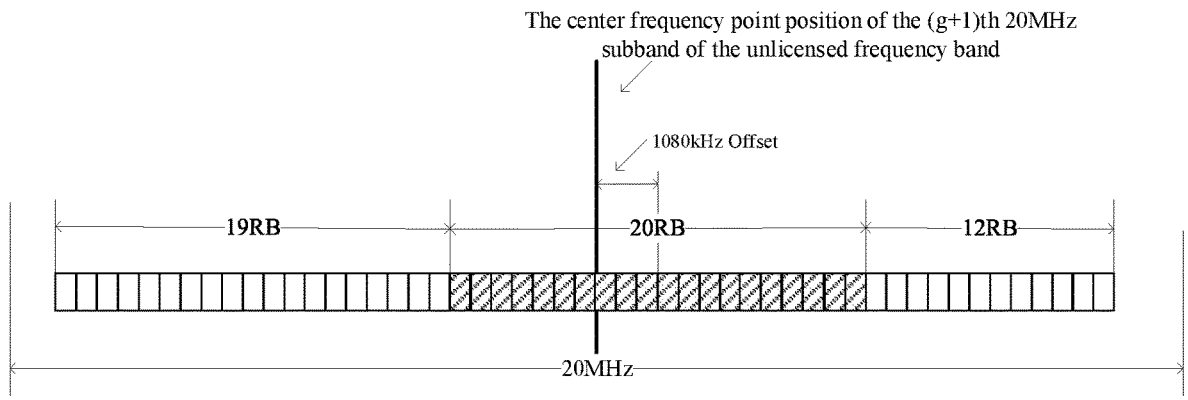
FIG. 8 is another schematic diagram of another synchronous signal transmission according to an embodiment of this application.

Specifically, as shown in FIG. 8, in the embodiment 6, the values of parameters in Formula 2 are as follows:

f1=5160 mhz, which is the center frequency point of the first 20 MHz subband of the unlicensed frequency band;

f1+(g*20) is the center frequency position of the (g+1)th 20 MHz subband of the unlicensed frequency band, and g is an integer;

f2=(25−(6*2+10))*12*30 kHz=1080 kHz.

To sum up, it is concluded that the frequency domain candidate positions of the synchronous signal are: fc=5161.08+(g*20) MHz, and g is an integer.

It should be noted that, as shown in FIG. 8, in additional to the 20 30 kHz RBS occupied by the synchronous signal block, there are 12 30 kHz continuous RBS. The 12 30 kHz RBS can ensure the PDCCH transmission. That is, the multiplexing in frequency domain of PDCCH and synchronous signal block is realized.

Specifically, in the embodiment 6, when the network device transmits the synchronization signal on the unlicensed frequency band, the synchronization signal block occupies 20 30 kHz RBs in the frequency domain (referring to the area represented by the shaded part in FIG. 8), and the network device selects one or more frequency points from the frequency points corresponding to fc to send the synchronous signal block. The central frequency point of the synchronization signal block is located on the frequency point selected by the network device. When the terminal device conducts cell search on the unlicensed frequency band, it tries to search the synchronization signal on the corresponding frequency points corresponding to fc.

Optionally, as tan embodiment 7, the first frequency domain position is the center frequency point position of the synchronization signal block, that is, the transmitting device determines the frequency domain candidate position of the synchronization signal according to the Formula 2.

Figure 9:
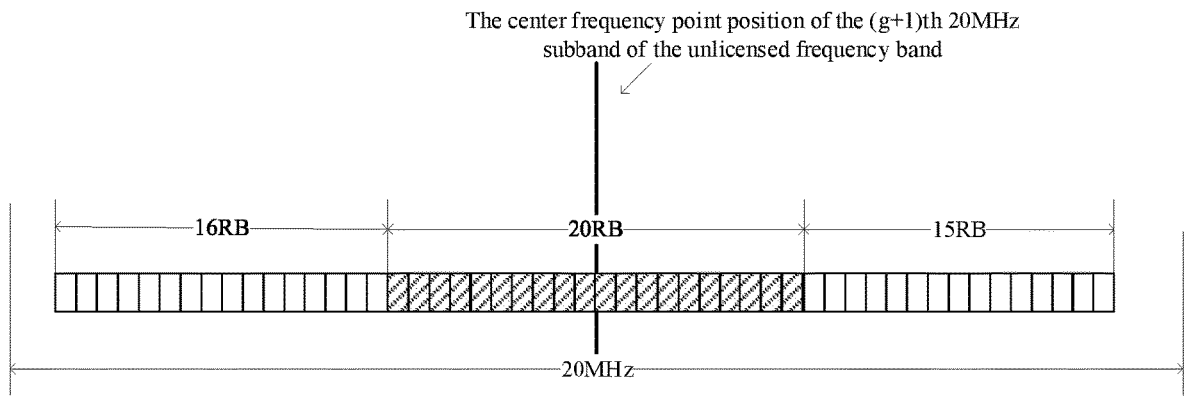
FIG. 9 is another schematic diagram of another synchronous signal transmission according to an embodiment of this application.

Specifically, as shown in FIG. 9, in the embodiment 7, the values of parameters in formula 2 are as follows:

f1=5160 mhz, which is the center frequency point of the first 20 MHz subband of the unlicensed frequency band;

f1+(g*20) is the center frequency position of the (g+1)th 20 MHz subband of the unlicensed frequency band, and g is an integer;

f2=0 kHz.

To sum up, it is concluded that the frequency domain candidate positions of the synchronous signal are: fc=5160+(g*20) MHz, and g is an integer.

Specifically, in the embodiment 7, when the network device transmits the synchronization signal on the unlicensed frequency band, the synchronization signal block occupies 20 30 kHz RBs in the frequency domain (referring to the area represented by the shaded part in FIG. 9), and the network device selects one or more frequency points from the frequency points corresponding to fc to send the synchronous signal block. The central frequency point of the synchronization signal block is located on the frequency point selected by the network device. When the terminal device conducts cell search on the unlicensed frequency band, it tries to search the synchronization signal on the corresponding frequency points corresponding to fc.

It should be understood that, in the embodiments 1 to 7 stated above, it is an example that the first frequency domain position is the center frequency point position of the synchronization signal block. The first frequency domain position is the position of the RE with the smallest number in the R) with the smallest number of the synchronous signal block (corresponding to Formula 9). And t the first frequency domain position is the position of the RE with the largest number in the RB with the largest number of the synchronous signal block (corresponding to formula 10). For brevity, details are not described herein again.

It should also be understood that, in the embodiments 1 to 7 stated above, it is an example for illustration that a 20 MHz unlicensed bandwidth includes 51 30 kHz RBs, and the subcarrier spacing is 30 kHz. The scenario of a 20 MHz unlicensed bandwidth including 106 15 kHz RBs and the subcarrier spacing being 15 kHz is also applicable. For brevity, details are not described herein again.

Therefore, in the embodiments of this application, the frequency domain candidate position of the synchronization signal on the unlicensed frequency band (also called SS raster) is designed, which can reduce the complexity of the cell initially searching and reduce the influence of the position, where a cell in the unlicensed frequency band initially access the synchronization signal block in the subband, on the other channels in the subband.

Figure 10:
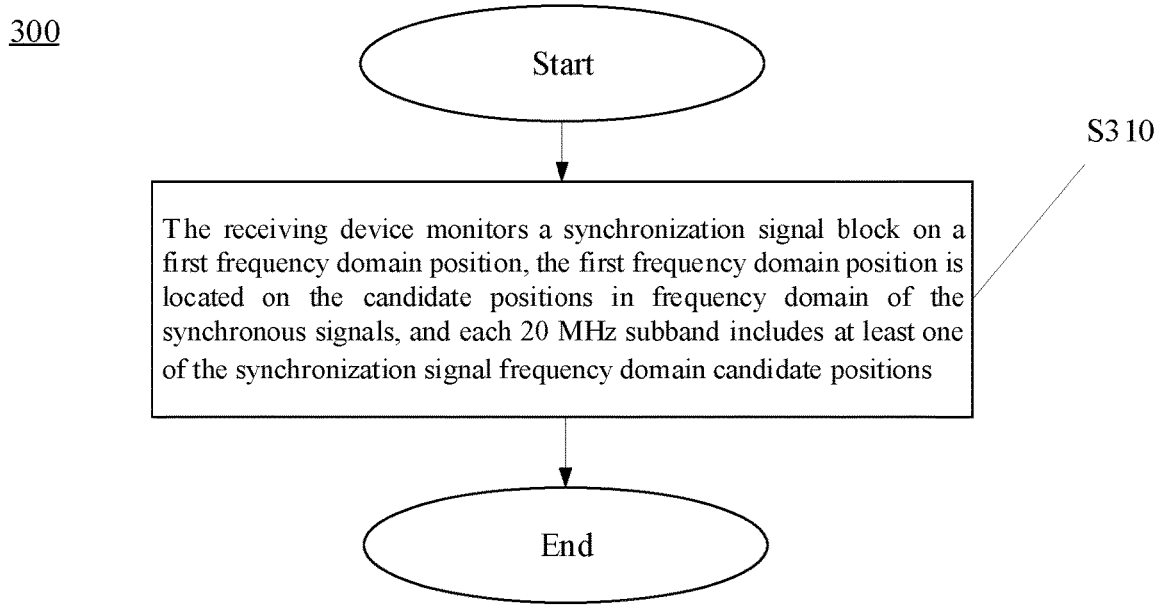
FIG. 10 is a schematic flow chart of another synchronous signal transmission method according to the embodiment of this application.

FIG. 10 is a schematic flow chart of a synchronous signal transmission method 300 according to an embodiment of this application. As shown in FIG. 10, the method 300 may include the following contents:

S310, the receiving device monitors a synchronization signal block on a first frequency domain position, the first frequency domain position is located on the candidate positions in frequency domain of the synchronous signals, and each 20 MHz subband includes at least one of the synchronization signal frequency domain candidate positions.

Optionally, the receiving device is a terminal device, for example, the terminal device shown in FIG. 1.

Optionally, in the embodiment of this application, the first frequency domain position can satisfy the following three situations:

In case 1, the first frequency domain position is the center frequency point position of the synchronization signal block;

In case 2, the first frequency domain position is the position of the RE with the smallest number in the RB with the smallest number of the synchronous signal block;

In case 3, the first frequency domain position is the position of the RE with the largest number in the RB with the largest number of the synchronous signal block.

Optionally, the first frequency domain position is the center frequency point position of the synchronization signal block.

Optionally, as an example 1, the first frequency domain position satisfies case 1, that is, the first frequency domain position is the center frequency point position of the synchronization signal block.

Optionally, in example 1, the receiving device determines the frequency domain candidate position of the synchronization signal according to the formula fc=f1+(g*20)+f2, wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset of the candidate position of the center frequency point of the synchronous signal within a 20 MHz subband.

Optionally, in example 1, the value of f2 is at least one of 180 hz, −180 kHz; or the value of the f2 is at least one of 0 Hz, 360 Hz and −360 kHz.

Optionally, in example 1, the receiving device determines that the f2 is at least one of the values satisfying the formula $f2=\pm(N_{bw}/2-(6n+N_{ssb}/2))*N_{sc}*\Delta F$ kHz, wherein, $N_{bw}$ is the RB number in 20 MHz bandwidth when the subcarrier spacing is $\Delta F$, $N_{ssb}$ is the RB number occupied by the synchronous signal block in frequency domain, $N_{sc}$ is the subcarrier number in one RB, and N is an integer.

Optionally, in example 1, the receiving device determines that the f2 is at least one of the values satisfying the formula $f2=\pm((N_{bw}\pm1)/2-(6n+N_{ssb}/2))*N_{sc}*\Delta F$ kHz, wherein, $N_{bw}$ is the RB number in 20 MHz bandwidth when the subcarrier spacing is $\Delta F$, $N_{ssb}$ is the RB number occupied by the synchronous signal block in frequency domain, $N_{sc}$ is the subcarrier number in one RB, and N is an integer.

Optionally, in example 1, the receiving device determines that the f2 is at least one of the values satisfying the formula $f2=\pm(25.5-(6n+10))*12*30$ kHz, $0 \le n \le 5$; or the receiving device determines that the f2 is at least one of the values satisfying the formula $f2=\pm(53-(6n+10))*12*15$ KHz, $0 \le n \le 14$; or the receiving device determines that the f2 is at least one of the values satisfying the formula $f2=\pm(26-(6n+10))*12*30$ kHz, $0 \le n \le 5$; or the receiving device determines that the f2 is at least one of the values satisfying the formula $f2=\pm(25-(6n+10))*12*30$ kHz, $0 \le n \le 5$.

Optionally, in example 1, the value of the f2 is at least one of 5580 kHz, 3420 kHz, 1260 kHz, −900 kHz, −3060 kHz and −5220 kHz; or the value of the f2 is at least one of 5220 kHz, 3060 kHz, 900 kHz, −1260 kHz, −3420 kHz and −5580 kHz; or the value of the f2 is at least one of 5760 kHz, 3600 kHz, 1440 kHz, −720 kHz, −2880 kHz and −5040 kHz; or the value of the f2 is at least one of 5040 kHz, 2880 kHz, 720 kHz, −1440 kHz, −3600 kHz and −5760 kHz; or the value of the f2 is at least one of 5400 kHz, 3240 kHz, 1080 kHz, −1080 kHz, −3240 kHz and −5400 kHz.

Optionally, as example 2, the first frequency domain position satisfies the case 2. That is, the first frequency domain position is the position of the RE with the smallest number in the RB with the smallest number of the synchronous signal block.

Optionally, in example 2, the receiving device determines the frequency domain candidate position of the synchronization signal according to the formula fc=f1+(g*20)+f2+f3, Wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset position of the candidate position of the center frequency point of the synchronous signal in a 20 MHz subband, f3 is the offset of the position of the RE with the smallest number in the RB with the smallest number of the synchronous signal block from the position of the center frequency point of the synchronous signal block.

Optionally, in example 2, the value of the f2 is at least one of 180 hz, −180 kHz; or the value of the f2 is at least one of 0 Hz, 360 Hz and −360 kHz.

Optionally, in example 2, the receiving device determines that the f2 is at least one of the values satisfying the formula $f2=\pm(N_{bw}/2-(6n+N_{ssb}/2))*N_{sc}*\Delta F$ kHz, wherein, $N_{bw}$ is the RB number in 20 MHz bandwidth when the subcarrier spacing is $\Delta F$, $N_{ssb}$ is the RB number occupied by the synchronous signal block in frequency domain, $N_{sc}$ is the subcarrier number in one RB, and N is an integer.

Optionally, in example 2, the receiving device determines that the f2 is at least one of the values satisfying the formula $f2=\pm((N_{bw}\pm1)/2-(6n+N_{ssb}/2))*N_{sc}*\Delta F$ kHz, wherein, $N_{bw}$ is the RB number in 20 MHz bandwidth when the subcarrier spacing is $\Delta F$, $N_{ssb}$ is the RB number occupied by the synchronous signal block in frequency domain, $N_{sc}$ is the subcarrier number in one RB, and N is an integer.

Optionally, in example 2, the receiving device determines that the f2 is at least one of the values satisfying the formula $f2=\pm(25.5-(6n+10))*12*30$ kHz, $0\leq n\leq5$; or the receiving device determines that the f2 is at least one of the values satisfying the formula $f2=\pm(53-(6n+10))*12*15$ KHz, $0\leq n\leq14$; or the receiving device determines that the f2 is at least one of the values satisfying the formula $f2=\pm(26-(6n+10))*12*30$ kHz, $0\leq n\leq5$; or the receiving device determines that the f2 is at least one of the values satisfying the formula $f2=\pm(25-(6n+10))*12*30$ kHz, $0\leq n\leq5$.

Optionally, in example 2, the value of the f2 is at least one of 5580 kHz, 3420 kHz, 1260 kHz, −900 kHz, −3060 kHz and −5220 kHz; or the value of the f2 is at least one of 5220 kHz, 3060 kHz, 900 kHz, −1260 kHz, −3420 kHz and −5580 kHz; or the value of the f2 is at least one of 5760 kHz, 3600 kHz, 1440 kHz, −720 kHz, −2880 kHz and −5040 kHz; or the value of the f2 is at least one of 5040 kHz, 2880 kHz, 720 kHz, −1440 kHz, −3600 kHz and −5760 kHz; or the value of the f2 is at least one of 5400 kHz, 3240 kHz, 1080 kHz, −1080 kHz, −3240 kHz and −5400 kHz.

Optionally, in example 2, if the synchronous signal block occupies 20 RBs in the frequency domain, and the subcarrier spacing of the synchronous signal blocks is 30 kHz, the transmitting device determines that the f3=−3600 kHz; or if the synchronous signal block occupies 20 RBs in the frequency domain, and the subcarrier spacing of the synchronous signal blocks is 15 kHz, the transmitter determines that the f3=−1800 kHz.

Optionally, as example 3, the first frequency domain position satisfies the case 3. That is, the first frequency domain position is the position of the RE with the largest number in the RB with the largest number of the synchronous signal block.

Optionally, in example 3, the receiving device determines the frequency domain candidate position of the synchronization signal according to the formula $fc=f1+(g*20)+f2+f4$, Wherein, fc is the candidate position in frequency domain of synchronous signal, f1 is the center frequency point position of the first 20 MHz subband of the unlicensed frequency band, $f1+(g*20)$ is the center frequency point position of the (g+1)th 20 MHz subband of the unlicensed frequency band, and g is an integer, f2 is the offset of the candidate position of the center frequency point of the synchronous signal in a 20 MHz subband, f4 is the offset of the position of the RE with the largest number in the RB with the largest number of the synchronous signal block from the center frequency point of the synchronous signal block.

Optionally, in example 3, the value of the f2 is at least one of 180 hz, −180 kHz; or the value of the f2 is at least one of 0 Hz, 360 hz and −360 kHz.

Optionally, in example 3, the receiving device determines that the f2 is at least one of the values satisfying the formula $f2=\pm(N_{bw}/2-(6n+N_{ssb}/2))*N_{sc}*\Delta f$ kHz, wherein, $N_{bw}$ is the RB number in 20 MHz bandwidth when the subcarrier spacing is $\Delta F$, $N_{ssb}$ is the RB number occupied by synchronous signal block in frequency domain, $N_{sc}$ N is the number of subcarriers in one RB, and N is an integer.

Optionally, in example 3, the receiving device determines that the f2 is at least one of the values satisfying the formula $f2=\pm((N_{bw}\pm1)/2-(6n+N_{ssb}/2))*N_{sc}*\Delta f$ kHz, wherein $N_{bw}$ is the RB number in 20 MHz bandwidth when the subcarrier spacing is $\Delta F$, $N_{ssb}$ is the RB number occupied by synchronous signal block in frequency domain, $N_{sc}$ is the number of subcarriers in one RB, and N is an integer.

Optionally, in example 3, the receiving device determines that the f2 is at least one of the values satisfying the formula $f2=\pm(25.5-(6n+10))*12*30$ kHz, $0\leq n\leq5$; or the receiving device determines that the f2 is at least one of the values satisfying the formula $f2=\pm(53-(6n+10))*12*15$ KHz, $0\leq n\leq14$; or the receiving device determines that the f2 is at least one of the values satisfying the formula $f2=\pm(26-(6n+10))*12*30$ kHz, $0\leq n\leq5$; or the receiving device determines that the f2 is at least one of the values satisfying the formula $f2=\pm(25-(6n+10))*12*30$ kHz, $0\leq n\leq5$.

Optionally, in example 3, the value of the f2 is at least one of 5580 kHz, 3420 kHz, 1260 kHz, −900 kHz, −3060 kHz and −5220 kHz; or the value of f2 is at least one of 5220 kHz, 3060 kHz, 900 kHz, −1260 kHz, −3420 kHz and −5580 kHz; or the value of the f2 is at least one of 5760 kHz, 3600 kHz, 1440 kHz, −720 kHz, −2880 kHz and −5040 kHz; or the value of the f2 is at least one of 5040 kHz, 2880 kHz, 720 kHz, −1440 kHz, −3600 kHz and −5760 kHz; or the value of the f2 is at least one of 5400 kHz, 3240 kHz, 1080 kHz, −1080 kHz, −3240 kHz and −5400 kHz.

Optionally, in example 3, if the synchronous signal block occupies 20 RBs in the frequency domain, and the subcarrier spacing of the synchronous signal blocks is 30 kHz, the transmitting device determines that the f4=3600 kHz; or if the synchronous signal block occupies 20 RBs in the frequency domain, and the subcarrier spacing of the synchronous signal blocks is 15 kHz, the transmitter determines that the f4=1800 kHz.

It should be understood that the steps in the method 300 of synchronous signal transmission can refer to the corresponding steps in the method 200 of synchronous signal transmission. For brevity, details are not described herein again.

Therefore, in the embodiments of this application, the frequency domain candidate position of the synchronization signal on the unlicensed frequency band (also called SS raster) is designed, which can reduce the complexity of the cell initially searching and reduce the influence of the position, where a cell in the unlicensed frequency band initially access the synchronization signal block in the subband, on the other channels in the subband.

Figure 11:
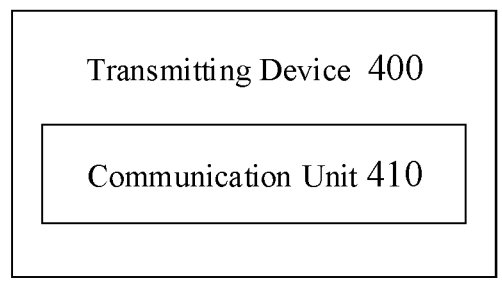
FIG. 11 is a schematic block diagram of a transmitting device according to an embodiment of this application.

FIG. 11 shows a schematic block diagram of a transmitting device 400 according to an embodiment of this application. As shown in FIG. 11, the transmitting device 400 includes:

a communication unit 410, configured to transmit a synchronization signal block at a first frequency domain position located on a frequency domain candidate position of a synchronous signal, and each 20 MHz subband includes at least one frequency domain candidate position of the synchronization signal.

Optionally, the first frequency domain position is the center frequency point position of the synchronization signal block.

Optionally, the transmitting device 400 further includes:

a processing unit 420, configured to determine the frequency domain candidate position of the synchronization signal according to the formula fc=f1+(g*20)+f2, wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset of the candidate position of the center frequency point of the synchronous signal within a 20 MHz subband.

Optionally, the transmitting device 400 further includes:

a processing unit 420, configured to determine the frequency domain candidate position of the synchronous signal according to the formula fc=f1+(g*20)+f2+f3, wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset of the candidate position of the center frequency point of the synchronous signal in a 20 MHz subband, f3 is the offset of the position of the RE with the smallest number in the RB with the smallest number of the synchronous signal block from the position of the center frequency point of the synchronous signal block.

Optionally, the processing unit 420 is further configured to:

determine the f3=−3600 kHz if the synchronous signal block occupies 20 RBs in the frequency domain, and the subcarrier spacing of the synchronous signal blocks is 30 kHz; or determine the f3=−1800 kHz if the synchronous signal block occupies 20 RBs in the frequency domain, and the subcarrier spacing of the synchronous signal blocks is 15 kHz.

Optionally, the first frequency domain position is the position of the RE with the largest number in the RB with the largest number of the synchronous signal block.

Optionally, the transmitting device 400 further includes:

a processing unit 420 is used to determine the frequency domain candidate position of the synchronous signal according to the formula fc=f1+(g*20)+f2+f4, wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset position of the candidate position of the center frequency point of the synchronous signal in a 20 MHz subband, f4 is the offset of the position of the RE with the largest number in the RB with the largest number of the synchronous signal block from the center frequency point of the synchronous signal block.

Optionally, the processing unit 420 is further configured to:

determine the f4=3600 kHz if the synchronous signal block occupies 20 RBs in the frequency domain, and the subcarrier spacing of the synchronous signal blocks is 30 kHz; or determine the f4=1800 kHz if the synchronous signal block occupies 20 RBs in the frequency domain, and the subcarrier spacing of the synchronous signal blocks is 15 kHz.

Optionally, the value of f2 is at least one of 180 hz, −180 kHz; or the value of the f2 is at least one of 0 Hz, 360 hz and −360 kHz.

Optionally, the processing unit 420 is further configured to:

determine that the f2 is at least one of the values satisfying the formula $f2=\pm(N_{bw}/2-(6n+N_{ssb}/2))*N_{sc}*\Delta f$ kHz, wherein, $N_{bw}$ is the RB number in 20 MHz bandwidth when the subcarrier spacing is $\Delta F$, $N_{ssb}$ is the number of Rb occupied by synchronous signal block in frequency domain, $N_{sc}$ is the number of subcarriers in one Rb, and N is an integer.

Optionally, the processing unit 420 is further configured to:

determine that the f2 is at least one of the values satisfying the formula $f2=\pm((N_{bw}\pm1)/2-(6n+N_{ssb}/2))*N_{sc}*\Delta f$ kHz, wherein, $N_{bw}$ is the RB number in 20 MHz bandwidth when the subcarrier spacing is $\Delta F$, $N_{ssb}$ is the RB number occupied by synchronous signal block in frequency domain, $N_{sc}$ is the number of subcarriers in one RB, and N is an integer.

Optionally, the processing unit 420 is further configured to:

determine that the f2 is at least one of the value satisfying the formula f2=±(25.5−(6N+10))*12*30 kHz, 0≤n≤5; or determine that the f2 is at least one of the values satisfying the formula f2=±(53−(6N+10))*12*15 KHz, 0≤n≤14; or determine that the f2 is at least one of the values satisfying the formula f2=±(26−(6N+10))*12*30 kHz, 0≤n≤5; or determine that the f2 is at least one of the values satisfying the formula f2=±(25−(6N+10))*12*30 kHz, 0≤n≤5.

Optionally, the value of the f2 is at least one of 5580 kHz, 3420 kHz, 1260 kHz, −900 kHz, −3060 kHz and −5220 kHz; or The value of the f2 is at least one of 5220 kHz, 3060 kHz, 900 kHz, −1260 kHz, −3420 kHz and −5580 kHz; or The value of the f2 is at least one of 5760 kHz, 3600 kHz, 1440 kHz, −720 kHz, −2880 kHz and −5040 kHz; or The value of the f2 is at least one of 5040 kHz, 2880 kHz, 720 kHz, −1440 kHz, −3600 kHz and −5760 kHz; or The value of the f2 is at least one of 5400 kHz, 3240 kHz, 1080 kHz, −1080 kHz, −3240 kHz and −5400 kHz.

Optionally, the transmitting device 400 is a network device.

It should be understood that the transmitting device 400 according to the embodiment of this application can correspond to the transmitting device in the embodiments of the method of this application, and the above and other operations and/or functions of each unit in the transmitting device 400 respectively realize the corresponding processes of the transmitting device in the method 200 shown in FIG. 2, and will not be described here for brevity.

Figure 12:
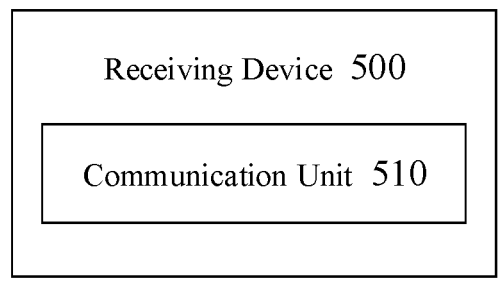
FIG. 12 is a schematic block diagram of a receiving device according to an embodiment of this application.

FIG. 12 shows a schematic block diagram of a receiving device 500 according to an embodiment of this application. As shown in FIG. 12, the receiving device 500 includes:

a communication unit 510, configured to monitor for a synchronization signal block at a first frequency domain position, which is located on the frequency domain candidate position of the synchronization signal, wherein each 20 MHz subband includes at least one frequency domain candidate position of the synchronization signal.

Optionally, the first frequency domain position is the center frequency point position of the synchronization signal block.

The receiving device 500 further includes:

a processing unit 520, configured to determine the frequency domain candidate position of the synchronous signal according to the formula fc=f1+(g*20)+f2, wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset position of the candidate position of the center frequency point of the synchronous signal in a 20 MHz subband.

Optionally, the first frequency domain position is the position of the RE with the smallest number of the RB with the smallest number in the synchronization signal block.

The receiving device 500 further includes:

a processing unit 520, configured to determine the frequency domain candidate position of the synchronous signal according to the formula fc=f1+(g*20)+f2+f3, wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset position of the candidate position of the center frequency point of the synchronous signal in a 20 MHz subband, f3 is the offset of the position of the RE with the smallest number in the RB with the smallest number in the synchronous signal block from the position of the center frequency point of the synchronous signal block.

Optionally, the processing unit 520 is further configured to:

determine the f3=−3600 kHz if the synchronous signal block occupies 20 RBs in the frequency domain, and the subcarrier spacing of the synchronous signal blocks is 30 kHz; or determine the f3=−1800 kHz if the synchronous signal block occupies 20 RBs in the frequency domain, and the subcarrier spacing of the synchronous signal blocks is 15 kHz.

Optionally, the first frequency domain position is the position of the RE with the largest number in the RB with the largest number in the synchronization signal block.

The receiving device 500 further includes:

a processing unit 520, configured to determine the frequency domain candidate position of the synchronous signal according to the formula fc=f1+(g*20)+f2+f4, wherein, fc is the candidate position in frequency domain of synchronous signal, f1 is the center frequency point position of the first 20 MHz subband of the unlicensed frequency band, f1+(g*20) is the center frequency point position of the (g+1)th 20 MHz subband of the unlicensed frequency band, and g is an integer, f2 is the offset of the candidate position of the center frequency point of the synchronous signal within a 20 MHz subband, f4 if the offset of the position of the RE with the largest number in the RB with the largest number of the synchronous signal block from the center frequency point of the synchronous signal block.

Optionally, the processing unit 520 is further configured to:

determine the f4=3600 kHz if the synchronous signal block occupies 20 RBs in the frequency domain, and the subcarrier spacing of the synchronous signal blocks is 30 kHz; or determine the f4=1800 kHz if the synchronous signal block occupies 20 RBs in the frequency domain, and the subcarrier spacing of the synchronous signal blocks is 15 kHz.

Optionally, the value of the f2 is at least one of 180 hz, −180 kHz; or the value of the f2 is at least one of 0 Hz, 360 hz and −360 kHz.

Optionally, the processing unit 520 is further configured to:

determine that the f2 is at least one of the values satisfying the formula f2=±($N_{bw}$/2−(6N+$n_{ssb}$/2))*$N_{sc}$*Δf kHz, wherein, $N_{bw}$ is the RB number in 20 MHz bandwidth when the subcarrier spacing is ΔF, $N_{ssb}$ is the RB number occupied by synchronous signal block in frequency domain, $N_{sc}$ is the number of subcarriers in one Rb, and N is an integer.

Optionally, the processing unit 520 is further configured to:

determine that the f2 is at least one of the values satisfying the formula $f2=\pm((N_{bw}\pm1)/2-(6N+N_{ssb}/2))*N_{sc}*\Delta f$ kHz, wherein $N_{bw}$ is the RB number in 20 MHz bandwidth when the subcarrier spacing is $\Delta F$, $N_{ssb}$ is the RB number occupied by synchronous signal block in frequency domain, $N_{sc}$ is the number of subcarriers in one RB, and N is an integer.

Optionally, the processing unit 520 is further configured to:

determine that the f2 is at least one of the values satisfying the formula $f2=\pm(25.5-(6n+10))*12*30$ kHz, $0\le n\le5$; or determine that the f2 is at least one of the values satisfying the formula $f2=\pm(53-(6n+10))*12*15$ KHz, $0\le n\le14$; or determine that the f2 is at least one of the values satisfying the formula $f2=\pm(26-(6n+10))*12*30$ kHz, $0\le n\le5$; or determine that the f2 is at least one of the values satisfying the formula $f2=\pm(25-(6n+10))*12*30$ kHz, $0\le n\le5$.

Optionally, the value of the f2 is at least one of 5580 kHz, 3420 kHz, 1260 kHz, −900 kHz, −3060 kHz and −5220 kHz; or the value of the f2 is at least one of 5220 kHz, 3060 kHz, 900 kHz, −1260 kHz, −3420 kHz and −5580 kHz; or the value of the f2 is at least one of 5760 kHz, 3600 kHz, 1440 kHz, −720 kHz, −2880 kHz and −5040 kHz; or the value of the f2 is at least one of 5040 kHz, 2880 kHz, 720 kHz, −1440 kHz, −3600 kHz and −5760 kHz; or the value of the f2 is at least one of 5400 kHz, 3240 kHz, 1080 kHz, −1080 kHz, −3240 kHz and −5400 kHz.

Optionally, the communication unit 510 is specifically configured to:

when cell search is performed on the unlicensed frequency band, monitor the synchronization signal block at the first frequency domain position.

Optionally, the receiving device 500 is a terminal device.

It should be understood that the receiving device 500 according to the embodiment of this application may correspond to the receiving device in the embodiments of the method of this application, and the above and other operations and/or functions of each unit in the receiving device 500 respectively realize the corresponding processes of the receiving device in the method 300 shown in FIG. 10, and will not be repeated here for brevity.

Figure 13:
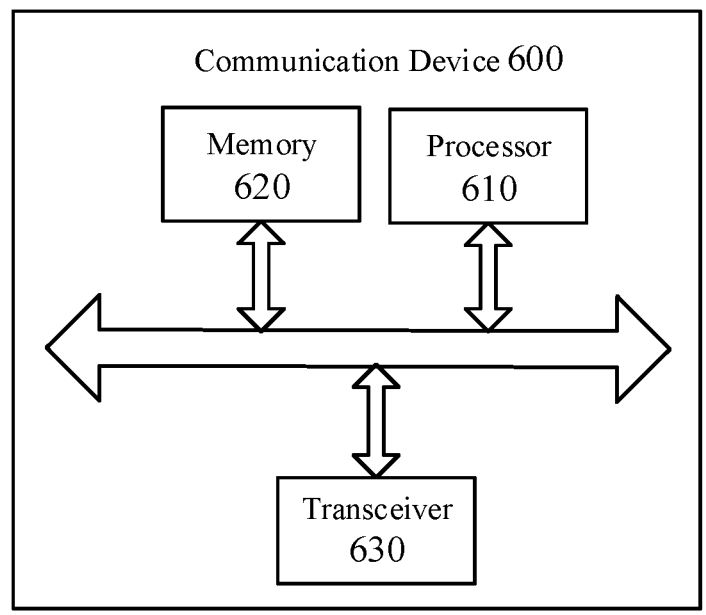
FIG. 13 is a schematic block diagram of a communication device according to an embodiment of this application.

FIG. 13 is a schematic structural diagram of a communication device 600 provided by the embodiment of this application. The communication device 600 shown in FIG. 13 includes a processor 610, which can call and run computer programs from the memory to realize the methods in the embodiments of this application.

Optionally, as shown in FIG. 13, the communication device 600 may also include a memory 620, wherein the processor 610 may call and run a computer program from the memory 620 to implement the method in the embodiment of this application.

The memory 620 may be a separate device independent of the processor 610, or may be integrated in the processor 610.

Optionally, as shown in FIG. 13, the communication device 600 may futher include a transceiver 630, which can be controlled by the processor 610 to communicate with other devices and, in particular, may send information or data to other devices, or receive information or data sent by other devices.

Wherein, the transceiver 630 may include a transmitter and a receiver. The transceiver 630 further includes antennas and the number of the antennas may be one or more.

Optionally, the communication device 600 may be the transmitting device of the embodiments of this application, and the communication device 600 may realize the corresponding processes realized by the transmitting device in each method of the embodiments of this application. For brevity, details are not described herein again.

Optionally, the communication device 600 may be the receiving device of the embodiment of this application, and the communication device 600 may realize the corresponding processes realized by the receiving device in each method of the embodiment of this application. For brevity, details are not described herein again.

Figure 14:
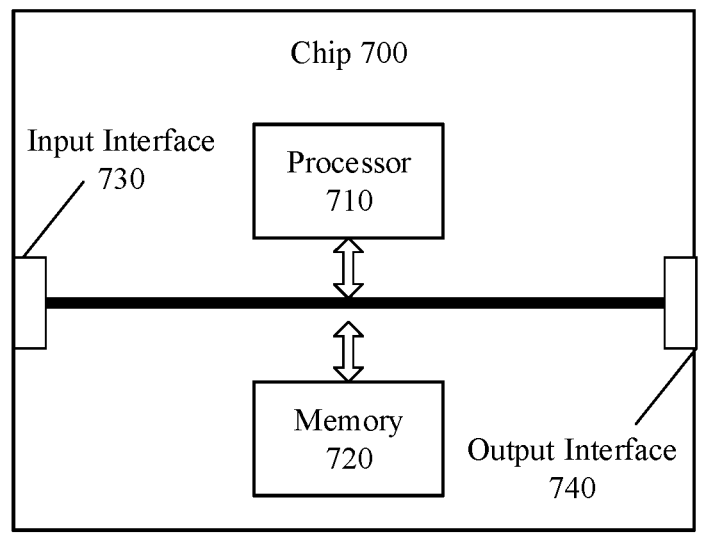
FIG. 14 is a schematic block diagram of a chip according to an embodiment of this application.

FIG. 14 is a schematic structure diagram of the chip in the embodiment of this application. The chip 700 shown in FIG. 14 includes a processor 710, which may call and run computer programs from the memory to realize the method in the embodiment of this application.

Optionally, as shown in FIG. 14, the chip 700 may also include a memory 720. Wherein the processor 710 may call and run a computer program from the memory 720 to realize the methods in the embodiment of this application.

The memory 720 may be a separate device independent of processor 710 or integrated in the processor 710.

Optionally, the chip 700 may also include an input interface 730. Wherein the processor 710 may control the input interface 730 to communicate with other devices or other chips, in specifically, may obtain information or data sent by the other devices or the other chips.

Optionally, the chip 700 may also include an output interface 740. Wherein the processor 710 may control the output interface 740 to communicate with other devices or other chips, in specifically, may output information or data to the other devices or the other chips.

Optionally, the chip may be applied to the transmitting device in the embodiments of this application, and the chip may realize the corresponding processes implemented by the transmitting device in each method of the embodiments of this application. For brevity, details are not described herein again.

Optionally, the chip may be applied to the receiving device in the embodiments of this application, and the chip may realize the corresponding processes realized by the receiving device in each method of the embodiments of this application. For brevity, details are not described herein again.

It should be understood that the chip mentioned in the embodiments of this application may also be referred to as system level chip, system chip, chip system or system on chip chip, etc.

Figure 15:
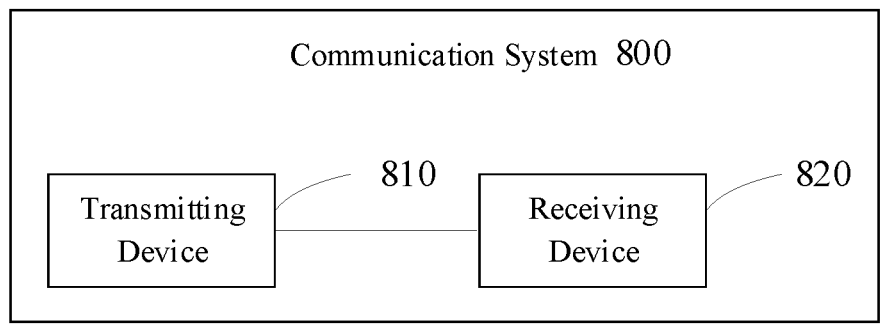
FIG. 15 is a schematic block diagram of a communication system according to an embodiment of this application.

FIG. 15 is a schematic block diagram of a communication system 800 provided by the embodiment of this application. As shown in FIG. 15, the communication system 800 includes a transmitting device 810 and a receiving device 820.

Wherein, the transmitting device 810 may be used to realize the corresponding functions realized by the transmitting device in the above methods, and the receiving device 820 may be used to realize the corresponding functions realized by the receiving device in the above methods. For brevity, details are not described herein again.

It should be understood that the processor of the embodiment of this application may be an integrated circuit chip with signal processing capability. In the implementation process, each step of the embodiments of the above methods may be completed through the integrated logic circuit of the hardware in the processor or the instruction in the form of software. The processor may be a general-purpose processor or a digital signal processor (DSP), an application specific integrated circuit (ASIC), a field programmable gate array (FPGA) or other programmable logic devices, discrete gates or transistor logic devices, and discrete hardware components. The methods, steps and logic block diagrams disclosed in the embodiments of this application may be implemented or executed. The general processor may be a microprocessor or any conventional processor, etc. The steps of the method disclosed in the embodiments of this application may completely executed by the hardware decoder processor directly, or by a combination of hardware and software modules in the decoder processor. The software modules may be located in a RAM, a flash memory, a read-only memory, a programmable read-only memory, or an electrically erasable programmable memory, a register and other mature storage media in the field. The storage medium is located in the memory. The processor reads the information in the memory and completes the steps of the above methods in combination with the hardware.

It may be understood that the memory in the embodiments of this application may be a volatile memory or a non-volatile memory, or may include both volatile and nonvolatile memories. Wherein the nonvolatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By example but not by limitation, many forms of RAM are available, such as a static RAM (SRAM), a dynamic RAM (DRAM), a synchronous DRAM (SDRAM), a double data rate SDRAM (DDR SDRAM), an enhanced SDRAM, (ESDRAM), a synchlink DRAM (SLDRAM) and a direct rambus RAM (DR RAM). It should be noted that the memory of the systems and methods described herein is intended to include, but is not limited to, these and any other suitable types of memory. It should be understood that the above memories are examples for illustation but not limitation. For example, the memory in the embodiments of this application may also be a static random access memory (SRAM), a dynamic random access memory (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM) and so on. That is, the storage in the embodiments of this application is intended to include but not be limited to these and any other suitable types of storages.

The embodiments of this application also provide a computer-readable storage medium for storing computer programs.

Optionally, the computer-readable storage medium may be applied to the transmitting device in the embodiments of this application, and the computer program enables the computer to execute the corresponding processes realized by the transmitting device in the various methods of the embodiments of this application. For brevity, details are not described herein again.

Optionally, the computer-readable storage medium may be applied to the receiving device in the embodiments of this application, and the computer program enables the computer to execute the corresponding processes implemented by the receiving device in the various methods of the embodiments of this application. For brevity, details are not described herein again.

The embodiments of this application also provide a computer program product including computer program instructions.

Optionally, the computer program product may be applied to the transmitting device in the embodiments of this application, and the computer program instruction enables the computer to execute the corresponding processes realized by the transmitting device in each method of the embodiments of this application. For brevity, details are not described herein again.

Optionally, the computer program product may be applied to the receiving device in the embodiment of this application, and the computer program instruction enables the computer to execute the corresponding processes realized by the receiving device in each method of the embodiments of this application. For brevity, details are not described herein again.

The embodiment of this application also provides a computer program.

Optionally, the computer program may be applied to the transmitting device in the embodiment of this application. When the computer program is running on the computer, the computer may execute the corresponding processes realized by the transmitting device in each method of the embodiments of this application. For brevity, details are not described herein again.

Optionally, the computer program may be applied to the receiving device in the embodiments of this application. When the computer program is running on the computer, the computer may execute the corresponding processes realized by the receiving device in each method of the embodiments of this application. For brevity, details are not described herein again.

A person skilled in the art may realize that the units and algorithm steps of each example described in the embodiments disclosed herein may be realized in an electronic hardware, in a computer software or in combination with the computer software and the electronic hardware. Whether these functions are performed in hardware or software mode depends on the specific application and design constraints of the technical solution. Professional technicians may use different methods to realize the described functions for each specific application, but such realizations shall not be considered beyond the scope of this application.

A person skilled in the art may clearly understand that for the convenience and conciseness of the description, the specific working process of the system, the device and the unit described above may refer to the corresponding process in the embodiments of the above methods, and details are not described herein again.

In the embodiments provided by this application, it should be understood that the disclosed systems, the devices and the methods may be implemented in other ways. For example, the device embodiment described above is only schematic. For example, the division of the unit is only a logic function division, and there may be another division mode in the actual implementation. For example, multiple units or components may be combined or integrated into another system, or some features may be ignored or not implemented. Another point, the coupling or direct coupling or communication connection between each other shown or discussed may be indirect coupling or communication connection through some interfaces, devices or units, and may be in electrical, mechanical or other forms.

The unit described as a separation component may or may not be physically separated, and the component displayed as a unit may be or may not be a physical unit, that is, it may be located in one place or distributed on a plurality of network units. Some or all of the units may be selected according to actual needs to realize the purpose of the present embodiment.

In addition, each functional unit in each embodiment of this application may be integrated into a processing unit, each unit may exist independently, or two or more units may be integrated in one unit.

If the function is realized in the form of a software function unit and sold or used as an independent product, it may be stored in a computer-readable storage medium. Based on such understanding, the essence part of the technical solution of this application, the part that contributes to the existing technology or the part of the technical solution can be embodied in the form of software products. The computer software product is stored in a storage medium, including a number of instructions to enable a computer device (which may be a personal computer, a server, or a network device, etc.) to perform all or some of the steps of the methods described in each embodiment of this application). The storage medium stated above includes: a U disk, a, removable hard disk, a read-only Memory (ROM), a random access memory (RAM), a diskette or a CD-ROM, etc., which may store program code.

The above mentioned is merely specific implementations of this application, but not limit the protection scope of this application. Any variation or replacement readily figured only by a person skilled in the art within the technical scope disclosed in this application shall fall within the protection scope of this application. Therefore, the protection scope of this application shall be subject to the protection scope of the claims.

What is claimed is:

1. A method for synchronous signal transmission, characterized in that the method comprises:
    transmitting, by a transmitting device, a synchronization signal block on a first frequency domain position, wherein the first frequency domain position is located on a frequency domain candidate position of a synchronization signal, and each 20 MHz subband comprises one frequency domain candidate position of the synchronization signal,
    wherein the frequency domain candidate position of the synchronization signal fc, a center frequency point position of a first 20 MHz subband of an unlicensed frequency band f1, and an offset of a candidate position of a center frequency point of the synchronization signal within a 20 MHz subband f2 satisfy a formula fc=f1+(g*20)+f2,
    wherein,
    f1+(g*20) is a center frequency point position of a (g+1)th 20 MHz subband of the unlicensed frequency band, and g is an integer.

2. The method according to claim 1, wherein the first frequency domain position is the center frequency point position of the synchronization signal block.

3. The method according to claim 1, wherein,
    a value of the f2 is at least one of 180 hz, −180 kHz, 0 Hz, 360 hz, −360 kHz, 5220 kHz and 5040 kHz.

4. The method according to claim 1, wherein, a remaining part shall be continuous 6 RBs or integer multiples of 6 RBs after removing the frequency bandwidth occupied by synchronous signal blocks within a 20 MHz bandwidth.

5. A method for synchronous signal transmission, characterized in that the method comprises:
    monitoring, by the receiving device, for a synchronization signal block on a first frequency domain position, wherein first frequency domain position is located on a frequency domain candidate position of the synchronization signal, and each 20 MHz subband includes one frequency domain candidate position of the synchronization signal,
    wherein the frequency domain candidate position of the synchronization signal fc, a center frequency point position of a first 20 MHz subband of an unlicensed frequency band f1, and an offset of a candidate position of a center frequency point of the synchronization signal within a 20 MHz subband f2 satisfy a formula fc=f1+(g*20)+f2,
    wherein,
    f1+(g*20) is a center frequency point position of a (g+1)th 20 MHz subband of the unlicensed frequency band, and g is an integer.

6. The method according to claim 5, wherein the first frequency domain position is the center frequency point position of the synchronization signal block.

7. The method according to claim 5, wherein,
    a value of the f2 is at least one of 180 hz, −180 kHz, 0 Hz, 360 hz, −360 kHz, 5220 kHz and 5040 kHz.

8. The method according to claim 5, wherein, a remaining part shall be continuous 6 RBs or integer multiples of 6 RBs after removing the frequency bandwidth occupied by synchronous signal blocks within a 20 MHz bandwidth.

9. A transmitting device, wherein it comprises a processor and a memory, the memory is configured to store computer programs, and the processor is configured to call and run the computer programs stored in the memory to perform the method:
    transmitting, by a transmitting device, a synchronization signal block on a first frequency domain position, wherein the first frequency domain position is located on a frequency domain candidate position of a synchronization signal, and each 20 MHz subband comprises one frequency domain candidate position of the synchronization signal,
    wherein the frequency domain candidate position of the synchronization signal fc, a center frequency point position of a first 20 MHz subband of an unlicensed frequency band f1, and an offset of a candidate position of a center frequency point of the synchronization signal within a 20 MHz subband f2 satisfy a formula fc=f1+(g*20)+f2,
    wherein,
    f1+(g*20) is a center frequency point position of a (g+1)th 20 MHz subband of the unlicensed frequency band, and g is an integer.

10. The transmitting device according to claim 9, wherein the first frequency domain position is the center frequency point position of the synchronization signal block.

11. The transmitting device according to claim 9, wherein,
    a value of the f2 is at least one of 180 hz, −180 kHz, 0 Hz, 360 hz, −360 kHz, 5220 kHz and 5040 kHz.

12. The transmitting device according to claim 9, wherein, a remaining part shall be continuous 6 RBs or integer multiples of 6 RBs after removing the frequency bandwidth occupied by synchronous signal blocks within a 20 MHz bandwidth.

13. A receiving end device, wherein it comprises a processor and a memory, the memory is configured to store computer programs, and the processor is configured to call and run the computer programs stored in the memory to perform the method:
    monitoring, by the receiving device, for a synchronization signal block on a first frequency domain position, wherein first frequency domain position is located on a frequency domain candidate position of the synchronization signal, and each 20 MHz subband includes one frequency domain candidate position of the synchronization signal, wherein the frequency domain candidate position of the synchronization signal fc, a center frequency point position of a first 20 MHz subband of an unlicensed frequency band f1, and an offset of a candidate position of a center frequency point of the synchronization signal within a 20 MHz subband f2 satisfy a formula fc=f1+(g*20)+f2, wherein, f1+(g*20) is a center frequency point position of a (g+1)th 20 MHz subband of the unlicensed frequency band, and g is an integer.

14. The receiving end device according to claim 13, wherein the first frequency domain position is the center frequency point position of the synchronization signal block.

15. The receiving end device according to claim 13, wherein a value of the f2 is at least one of 180 hz, −180 kHz, 0 Hz, 360 hz, −360 kHz, 5220 kHz and 5040 kHz.

16. The receiving end device according to a claim 13, wherein a remaining part shall be continuous 6 RBs or integer multiples of 6 RBs after removing the frequency bandwidth occupied by synchronous signal blocks within a 20 MHz bandwidth.

* * * * *